Figure 1:
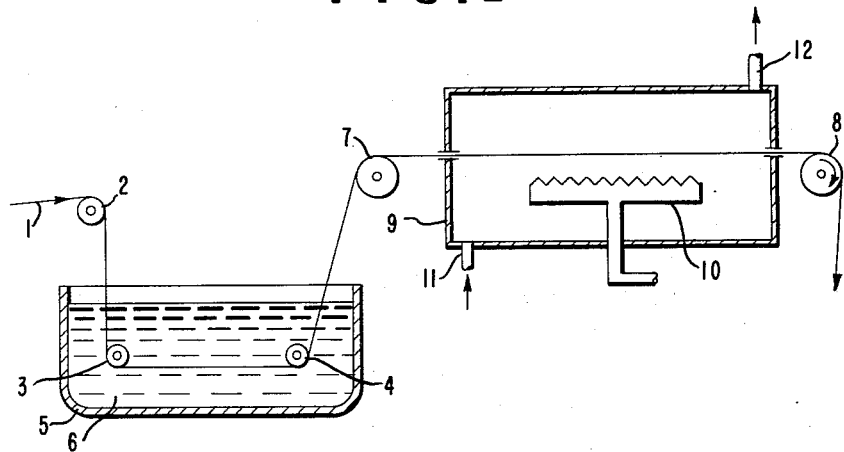

Oct. 11, 1960  C. R. KOLLER  2,955,961
PROCESS OF COATING POLYETHYLENE TEREPHTHALATE SUBSTRATE
WITH A POLYURETHANE AND RESULTANT ARTICLE
Filed Jan. 24, 1958

— POLYURETHANE
— POLYESTER

INVENTOR
CHARLES R. KOLLER

BY *William Patey*

ATTORNEY

United States Patent Office 2,955,961
Patented Oct. 11, 1960

2,955,961
PROCESS OF COATING POLYETHYLENE TEREPHTHALATE SUBSTRATE WITH A POLYURETHANE AND RESULTANT ARTICLE

Charles Richard Koller, Newark, Del., assignor to E. I. du Pont de Nemours and Company, Wilmington, Del., a corporation of Delaware Filed Jan. 24, 1958, Ser. No. 710,847

13 Claims. (Cl. 117—138.8)

This invention concerns compositions of matter and more specifically synthetic films, filaments and fabrics coated with a surface layer of organic polymer.

Synthetic organic polymers have been known and recognized as useful in the form of films, ribbons, filaments, fibers and the like. These materials have advantages as compared to naturally occuring filaments and fibers in that they have higher strength and greater chemical inertness and are less sensitive to the effects of water. At the same time, some of these synthetic polymers, notably polyesters, have certain disadvantages, many of which appear to arise out of the fact that the surface of the material (film, filament, or fabric) exhibits a very low tendency to adhere to, or form secondary and temporary bonds with, other useful materials such as inks, dyes, adhesives and other polymers, as well as with water and aqueous solutions and suspensions. The same low water sensitivity which makes fabrics prepared from synthetic organic fibers wrinkle- and crease-resistant also means that such fabrics show a greater tendency to pick up oily types of soil and that such soil is more difficult to remove from the fabric by washing in water.

In addition, perhaps because of the same surface properties, these materials, most notably synthetic polyesters, have poor adhesion to rubber and synthetic elastomers and to the "dipping" or bonding agents which are conventionally used to improve adhesion between rubber and other polymers. It has been observed that when inks, paints, adhesives, rubber and the like are applied to polyester materials not only is the receptivity of the polymer very low, but also the material which does adhere has a poor level of permanence.

Moreover, such polyester materials both in the form of fabrics and films have a tendency to generate static charges which are not readily dissipated because the material does not pick up a conducting film of water. Advantages and disadvantages of this type are particularly noticeable in polyester films, fibers and filaments and in formed articles made from poly(ethylene terephthalate).

It would be desirable to have available a synthetic organic polymer material which would combine the high physical strength and chemical inertness typical of polymeric materials, such as polyesters, with modified surface properties. The desired surface behavior would include among other effects, improved adhesion to other polymers, greater receptivity to printing inks and dyes, increased anti-soiling properties, increased ease of cleaning once soiled, greater water-wettability and lower tendency to generate and retain static electrical charges. It would be particularly desirable if such a surface could be prepared so as to be permanent to a high degree in the face of washing, abrasion, exposure to heat and sunlight and other normal use-treatment, and further desirable that the surface be colorless and remain uncolored after prolonged use.

It is an object of this invention to provide polyester materials, and in particular poly(ethylene terephthalate), in the form of shaped articles convenient for use directly or for further processing into useful substances, the polyester having a permanently modified surface bestowing on the composite product, in addition to the high physical strength and chemical inertness of the base polyester material, greater surface compatability leading to better adhesion to polymers, inks and dyes, increased water-wettability and the soil resisting qualities and easy cleaning nature of a hydrophilic material.

This object is achieved by providing coated shaped articles comprising a substrate of at least about 90% by weight of poly(ethylene terephthalate), the coating comprising essentially a polyurethane reaction product of piperazine and the bis-chloroformate of ethylene glycol having a structural formula with the recurring unit:

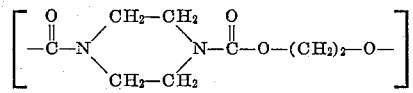

the polyurethane coating being present on the surface of the polyester base material to the extent of at least about 0.1% by weight of the total structure. The shaped articles may be films, ribbons, and filaments, as well as knitted, woven and non-woven fabrics from such filaments. In the description which follows, this polymer will be referred to as "the polyurethane."

It has been found that two polymers, poly(ethylene terephthalate) and the polyurethane are highly specific for one another. The polyurethane coating can be applied to the base material in the form of a solution in an organic solvent, which is then evaporated to leave behind the polymer deposited on the base material, or in the form of an emulsion of the polymer solution in a water-immiscible solvent which is emulsified in water to provide a two-phase system suitable for application. Other methods of applying the polyurethane coating material can also be used as will be apparent to those skilled in the art.

In all cases, the polyurethane coating can be applied to the surface of a film or ribbon or to a filament or bundle of filaments or to a knitted, woven, or non-woven fabric already made from filaments or yarns or fibers of the polyester material.

Among the various possible ways of obtaining the products of this invention some will be found more suitable than others as applied to one or another of the specific embodiments. In general, however, the most satisfactory single method of surface-coating the base material, for example, a fabric, is to pad a water-based emulsion containing an organic solution of the polyurethane onto the preformed fabric or to dip the fabric in such an emulsion, and then to dry the wetted fabric, preferably at an elevated temperature, for example, 100° C. or higher. This procedure gives a coating of superior durability with good uniformity and evenness of distribution of the polyurethane over the base material.

Minor amounts of polyurethane copolymers can be incorporated in the coating material, and such copolymers include polyurethanes prepared from homologs of piperazine and from aliphatic, alicyclic and aromatic diamines containing at least two carbon atoms, such as dimethyl piperazine, ethylene diamine, hexamethylene diamine, 1,4-cyclohexane diamine and para-phenylene diamine, in reaction with bischloroformates of ethylene glycol, tetramethylene glycol, hexamethylene glycol, cyclohexane diol and the like. Minor amounts of other condensation polymers prepared from intermediates coreactant with the piperazine and bis-chloroformate of ethylene glycol can also be employed. Such polymer ingredients include adipic and sebacic acid, terephthalic acid and the amide-forming derivatives of these acids; glycols, diphenols and other dihydroxy compounds, diisocyanates, phosgene, biscarbamyl chlorides and other polyurea-forming reactants and similar compounds. The substrate can consist of other polyesters, polyamides, polyurethanes and similar condensation polymers such as poly(hexamethylene adipamide), poly(meta-phenylene isophthalamide), poly(ethylene isophthalate) and poly(hexamethylene adipate), as well as monomeric and inorganic substances such as pigments, dyes, fillers, opacifiers and delustrants including barium sulfate, titanium dioxide, silica, zinc oxide, carbon black, cadmium sulfide and similar materials. It is preferred for the best combination of permanency of coating and improved water wettability that the polyurethane coating should consist entirely of repeating units of the structure already indicated. For highest adhesion of the coating, the substrate should comprise at least about 90% by weight of poly(ethylene terephthalate).

By the practice of this invention, there are obtained useful products which combine the superior physical and chemical characteristics of the polyester base material together with a hydrophilic behavior characteristic of the polyurethane on the polymer surface. By virtue of the unusual and specific compatability of the two polymeric materials, the coatings which are obtained by this combination of substrate and superstrate are highly permanent and the desired modification of properties is retained throughout extended use. The polyurethane has good whiteness and retention of whiteness, and high stability to washing, dry cleaning, exposure to sunlight, etc.

Poly(ethylene terephthalate) fibers, films and the like are well known in commerce. In the description which follows, the polyester fibers which are used are poly(ethylene terephthalate) which have been scoured and washed to remove all traces of temporary finishes. "Mylar" (trademark for E. I. du Pont de Nemour's poly(ethylene terephthalate) film) can be treated in a similar manner.

The polyurethane may be prepared in accordance with the description given in U.S. 2,731,446. However, other low-temperature polymerization processes are also useful, and many variations in process detail can be employed.

Specifically, in low temperature polymerization reactions of the kind described in U.S. 2,731,446, it has been conventional to obtain the polymer as a bulk phase in the form of granules or clumps of polymeric material which then must be washed and otherwise purified before they can be made into a solution or emulsion satisfactory for use in the processes of the present invention. Now, low temperature two-phase polymerization process variations have been developed which make it possible to obtain the polymer in a form in which it can be more readily used, without the necessity of isolating it as a solid phase, purifying it and then redissolving or emulsifying it.

In one such technique, an emulsifying agent is added to an aqueous alkaline piperazine solution. This solution is rapidly stirred while into it is sprayed ethylene bischloroformate dissolved in methylene chloride, using an atomizer as a sprayer. With this technique an emulsion of the polymer forms immediately.

Another variation involves the preparation of the polyurethane as a stable solution in a chlorinated hydrocarbon solvent. The solution is stabilized by the addition of a trace of acid. Formic acid, acetic acid and hydrochloric acid are found to be suitable, and stable solutions are obtained when the pH of the supernatant aqueous layer obtained from the interfacial polymerization is below 3. In such interfacial polymerizations, as little acid acceptor as possible should be used. In some cases the organic solvent layer containing the polyurethane is slightly cloudy, but this cloudiness can be removed by treatment of the solution with a small amount of silica gel. This solution of polyurethane can be readily dispersed in water using, for example, Duponol ME, a crude grade of sodium lauryl sulphate, and emulsions of great stability are obtained.

Other techniques are also available for the preparation of purified solutions of polyurethane in an organic solvent directly from the polymerization process without isolating the polymers as a solid phase. The main object in the purification step is the removal of the by-product salt which is formed when the bischloroformate reacts with the piperazine to produce hydrochloric acid and this acid is neutralized by the acid acceptor, for example, sodium carbonate or sodium hydroxide. It is usually preferable to remove the salt from the polymer solution. In some cases, the aqueous layer present during the polymerization process will dissolve the bulk of the salt. In cases where this does not occur, the two layers can be separated and additional water can be added to the organic phase to scrub out the salt. However, instead of removing the salt, it is possible, when the salt remains, to inactivate it or isolate it so that it does not interfere with the further use of the polymer solutions. For example, the salt solution can be emulsified in the organic phase, or a second organic solvent can be added which is capable of forming a quaternary system in which the salt is soluble. Another technique is to actually make use of the salt as an ingredient in a hydrotropic solvent. Calcium chloride, zinc chloride and magnesium chloride, for example, are hydrotropic salts which in concentrated aqueous solutions dissolve a number of polymers. Under the proper concentration conditions, the polyurethane then preferentially dissolves in the aqueous phase rather than in the organic phase, the organic phase can be separated by decantation, and the aqueous polymer solution is ready for further processing.

The above techniques are not all of the possible methods of coating polyester fibers with the polyurethane. They are mentioned, however, to give an indication of the versatility and scope of processes useful in the present invention. It will, of course, be apparent to one skilled in the art that these various means of handling an interfacial polymerization are not limited to use in connection with the present invention. Wherever an interfacial polymerization reaction is performed, and particularly where one desires to obtain the polymeric product in the form of a solution or emulsion without separating the polymer as a solid phase, these and related techniques can be employed.

All of the above-mentioned process variations are useful in the formation of high molecular weight polyurethanes. While for the purposes of the present invention the polyurethane need not actually be fiber-forming a polyurethane of high molecular weight is found to be most satisfactory, as indicated by an inherent viscosity of about 0.6, up to about 2.0 or higher. However, it was found that small variations in the molecular weight of the polyurethane coating did not significantly affect either the improved wettability or the durability of the article.

Figure 2:

Suitable apparatus is shown in Figure 1 for coating filaments with the polyurethane coating composition of this invention. Filaments 1 from a conventional supply source (not shown) are passed by rolls 2, 3 and 4 through chamber 5 containing the polyurethane coating bath 6. After a suitable period of immersion, the coated filaments are guided by rolls 7 and 8 through a drying chamber 9 containing heating means 10 and being fitted with inlet 11 and outlet 12. The dried yarn is then directed to conventional windup means (not shown). A typical coated filament is shown in Figure 2.

In illustrating the practice of this invention, it is easiest to describe the results obtained in terms of specific examples. In many of these examples, a polyester fabric is treated with the polyurethane and then tested for soiling resistance in the laboratory using a standard oily soil, such as described by R. E. Wagg in the Journal of the Textile Institute 1952, page 515. Each test is carried out with four test samples together with control samples of untreated polyester fabric and untreated cotton fabric at the same time. Each of the fabrics is placed in a jar with identical amounts of a standard oily soil and after each jar has been thoroughly agitated to permit the soil to come in contact with the fabric, the reflectance of the soiled fabric is measured and compared with the initial reflectance before soiling. The ratio of the soiled fabric reflectance to the initial fabric reflectance is a measure of the soiling efficiency. The soiled fabrics are then washed in a controlled laboratory washing machine and the reflectance of the washed fabric is measured. The washing efficiency is then determined by the ratio of the washed reflectance to the initial reflectance. The washing efficiency of a treated fabric is compared with the washing efficiency of an untreated fabric to assess the improvement in loss of soil because of the presence of the polyurethane coating. A further measurement is the Washability Index, which represents the relative ease with which soil can be removed from a fabric, on a scale where cotton is rated as 100 and poly (ethylene terephthalate) fibers are rated as 0 (indicating high resistance to oily soil removal). This was calculated by the formula:

$$\text{Washability Index} = \frac{WE(\text{test}) - WE(\text{polyester})}{WE(\text{cotton}) - WE(\text{polyester})} \times 100$$

where WE is the washing efficiency and "test" refers to the treated sample, "polyester" refers to the untreated polyester, and "cotton" refers to a cotton sample.

In the following examples, parts are by weight.

EXAMPLE I

A polyurethane is prepared from piperazine and the bischloroformate of ethylene glycol by the method of U.S. Patent 2,731,446. An emulsion of this polymer is prepared by dissolving 40 parts of the polymer in 560 parts of a mixture of 90 volumes of chloroform and 10 volumes of methyl alcohol. This solution is added to 2,000 parts of water containing 3 parts of a synthetic detergent and the whole is combined with rapid stirring for two to three minutes. The emulsion is then filtered. The emulsion did not break during the filtering. This emulsion is then immediately used to treat a plain weave shirting fabric prepared from continuous filament poly (ethylene terephthalate) fiber. The fabric is soaked for 3 minutes, wrung out, resoaked, rinsed in water, wrung out, and dried in an oven at a temperature of 125° C. for 7 minutes. This fabric is then given one washing prior to further testing in order to remove any loosely bound particles. After the initial wash, the fabric contained 2.5% by weight of the polyurethane polymer. The treated fabric is then tested with a standard oily soil and washed to measure the ability of the fabric to be cleaned after soiling. The soiling efficiency ratio was 0.38. The washing efficiency was 0.75. In comparison with control fabrics, this treated fabric has a Washability Index as defined earlier of 100. The untreated fabric had a soiling efficiency of 0.35, a washing efficiency of 0.50 and a Washability Index of 0.

EXAMPLE II

A polyurethane emulsion is prepared from 15 parts of the polyurethane produced as in Example I by dissolving it in a mixture of 200 parts of methylene chloride and 12 parts of formic acid, mixing this solution wtih 250 parts of a 0.4% detergent solution in water, and diluting with 250 parts of water. A broadcloth fabric made of poly(ethylene terephthalate) staple fiber is soaked in this emulsion for 1 minute, wrung out, and air dried. The treated fabric is then heat treated for 10 minutes at 125° C. After scouring, the weight gain is found to be 5.5%. The soiling efficiency, washing efficiency, and Washability Index were 0.49, 0.79, and 97 respectively. After 20 wash cycles, the corresponding values were 0.15, 0.80, and 79.

EXAMPLE III

A number of men's shirts constructed of a plain weave of poly (ethylene terephthalate) continuous filaments are scoured thoroughly. These shirts are completely treated with the 1.54% emulsion of the polyurethane of Example I by soaking for three minutes in the emulsion with agitation and then wringing out the excess through a hand wringer. After air drying, the shirts are given a heat treatment for 10 minutes at 125° C. in an oven, and then scoured in a commercial washing machine at 50° C. for 15 minutes using a synthetic detergent. The individual shirts contain slightly varying amounts of the polyurethane polymer after this treatment. The weight gain due to the polyurethane which adhered to the shirt fabric varied from 1.0% to 3.5% following washing. These shirts are then wear-tested together with untreated controls by alternating shirts daily by each wearer. Each shirt is washed after each wearing, both shirts of any pair being washed in the same way. After ten successive wearings and washings of each shirt an evaluation is made of the appearance. The treated shirts show a marked improvement in resistance to oily soil and in cleanability at the end of this period of wear-testing. No appreciable difference is noted in other factors, such as absorption of perspiration or hotness or coldness during wearing. The treated shirts retained essentially all of the polyurethane coating after ten wearings as evidenced by no loss in weight.

In another test conducted in a similar manner, after 30 wearings and washings, the cuffs of an untreated control shirt are rated 3.2 whereas the cuffs of the treated shirt are rated 2.3. The rating scale is 1=no soiling, 2=slight soiling, 3=moderate soiling (borderline for wear acceptability), 4=unacceptable for business wear, and 5=extremely bad soiling.

EXAMPLE IV

The purpose of this example is to test the ability of polyurethane-treated polyester fabrics to resist laundry discoloration due to absorption of oil soluble types of impurities. This discoloration is noticeable in synthetic fiber garments which are washed by commercial laundries. Pieces of fabric are prepared from poly (ethylene terephthalate) staple fiber, and continuous filament fiber and a fabric containing a 65/35 blend of poly (ethylene terephthalate) fiber and cotton (a separate experiment shows that the polyurethane does not adhere to cotton). These fabrics are coated with the polyurethane emulsion in a similar manner as in Example II. The test fabrics along with a number of control fabrics are then repeatedly washed by a commercial laundry in a standard washing procedure and the fabrics ironed after each washing. After five wash and iron cycles, the fabrics are measured for color reflectance on a differential colorimeter. The treated fabrics show a significant improvement in resistance to greying and to yellowing after repeated washing and ironing. This is true both of the staple fabric, the continuous filament fabric and the fabric of polyester/cotton blend.

EXAMPLE V

In the following example a 2% solution of the polyurethane of Example I is prepared in a mixture of 88% chloroform and 12% methanol. A small amount of a dispersed blue dye 4-nitro 5-(M-methylolanilino)-, 8-dihydroxy anthroquinone is added to this solution. Into the solution containing the polyurethane and dye, a sample of poly (ethylene terephthalate) film is dipped. The film is air dried and then cured at 100° C. for 5 minutes. The adhesion of the polyurethane coating is determined by wet-abrading the film with a cloth towel by hand. The presence of the blue dye makes it easy to determine whether the film coating could be wiped off by this method. It is found that when poly (ethylene terephthalate) film is used the adhesion of the polyurethane to the film is excellent. A sample of film from type 6-6 nylon is similarly treated and tested, and the adhesion is found to be poor, the wet towel becoming considerably discolored on slight rubbing over the film.

EXAMPLE VI

A 3% solution of the polyurethane of Example I is prepared in a mixture of 88% chloroform and 12% methanol and to this solution there is added a 10% concentration of metallic aluminum powder. This mixture is agitated and a sample of poly (ethylene terephthalate) film is dipped into the suspension. Application of this pigmented coating to the film gives a highly reflective metal appearing sheet, suitable for use as a decorative film. In similar experiments, it is found possible to apply bronze powder, titanium dioxide pigment, calcium oxide and bentonite to a sample of poly (ethylene terephthalate) by suspending the powdered material in a solution of polyurethane.

EXAMPLE VII

This example will illustrate the increased water-wettability of a plain taffeta fabric of approximately 130 picks per inch made from poly (ethylene terephthalate) fibers which is coated with the polyurethane of the present invention as compared to an identical fabric of poly (ethylene terephthalate) fibers which has not been so coated. The tests are made by placing a 0.01 ml. drop of water on a sample of the scoured fabric held taut in an embroidery hoop and measuring the time required for the drop to completely wick into the fabric. The results of this test are shown in the table below. The first entry in the table shows the result with a control fabric which has no polyurethane coating, while the remaining entries show the decreased wetting time when coated fabrics are used. Each entry in the "Time" column is an average of three determinations.

*Table*

RATE OF WETTING OF TREATED AND UNTREATED FABRICS [1]

| Experiment | Percent Polyurethane Coating (by Weight) | Time for 0.01 ml. Drop of $H_2O$ to Wet Fabric, sec. |
|---|---|---|
| Control | none | 900 |
| 1 | 0.1 | 73 |
| 2 | 0.2 | 59 |
| 3 | 0.3 | 40 |
| 4 | 0.8 | 35 |
| 5 | 1.6 | 33 |
| 6 | 2.0 | 33 |

[1] Plain weave fabrics made of poly (ethylene terephthalate) continuous filament yarn, scoured before testing.

The results in the table show that even a very small amount of polyurethane is sufficient to lower the wetting time by more than a factor of 10 and that successively larger increments of the polyurethane coating decrease this wetting time even more. At approximately the 2% level no further decrease in wetting time is obtained as greater quantities of polyurethane are added.

In addition to an increase in water-wettability, polyester materials treated with the polyurethane show a very substantial increase in adhesion to rubber, as compared with untreated poly (ethylene terephthalate) material. A sample of untreated poly (ethylene terephthalate) cord (control) and an identical cord which is treated with polyurethane to give a 1% (by weight) coating, are made into rubber-cord test tubes, using a standard rubber adhesive. The cord in the control tube loses from 20 to 30% of its adhesion in a flexing test, while the polyurethane-coated cord shows virtually no loss of adhesion in the same test. In a straight test of adhesive tensile strength, a control cord bonded to rubber separated at 0.7 lb. pull, while the cord having 1% polyurethane coating requires 2.0 lb. pull to separate.

While the above examples show specific embodiments of the principles of this invention, it is not necessary to limit the use of these principles in this manner; rather, it is the intention of this description merely to indicate a range of applications. The piperazine polyurethane coatings of the type already described, when properly applied to a polyester base material adhere to that material strongly and durably. The bond formed between the two polymers is resistant to repeated and extended working, either wet or dry. Because of the increased water wettability of the polyurethane surface coatings, the material thus obtained has increased resistance to soiling and washes more readily when soil has been applied. The amount of soil remaining after washing is much smaller than with an untreated polyester fabric or material.

These advantages can be realized with a relatively small amount of polyurethane coating. As little as 0.1% by weight of the polyurethane improves the wettability characteristics by a factor greater than 10. As little as 0.5% polyurethane material gives some increase in soil resistance. About 3% polyurethane material gives a high degree of soil resistance. For applications such as improved adhesion of poly(ethylene terephthalate) fibers to rubber, a coating of about 1% polyurethane is optimum.

It is obvious that the polyurethane coating may be applied to a shaped object of the polyester at any stage in the manufacture of a finished article. For example, the coating may be applied to a finished shirt, to the cloth before it is made into a shirt, to the yarns before they are made into cloth, and to the fibers or filaments before they are made into yarns. If the coating is to exceed 5%, it is preferred that it be applied at an early stage of manufacture, that is to the filaments or staple fibers, to avoid obtaining an excessively stiff fabric.

I claim:

1. A shaped article comprising a polymeric substrate with a thin coating, the substrate comprising at least about 90% by weight of poly(ethylene terephthalate) and the coating comprising a polyurethane with a structural formula having the following recurring units:

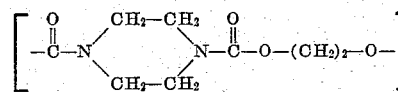

2. The shaped article of claim 1 wherein the coating is present to the extent of at least about 0.1% by weight of the total structure.

3. The article of claim 1 wherein the polyurethane coating has an inherent viscosity of at least about 0.6.

4. The article of claim 1 wherein the substrate comprises 100% by weight of poly(ethylene terephthalate).

5. The article of claim 1 wherein the polyurethane coating comprises solely the repeating units having the formula:

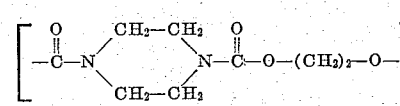

6. The article of claim 5 wherein the substrate comprises 100% by weight of poly(ethylene terephthalate).

7. A film comprising at least about 90% by weight of poly(ethylene terephthalate) having an adherent coating comprising a polyurethane with a structural formula having the following recurring units.

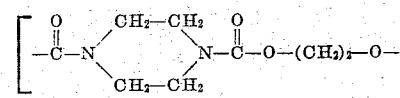

8. A filament comprising at least about 90% by weight of poly(ethylene terephthalate) having an adherent coating comprising a polyurethane with a structural formula having the following recurring units:

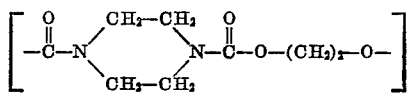

9. A fabric comprising the filaments of claims 8.

10. The process comprising coating a substrate comprising at least about 90% by weight of poly(ethylene terephthalate) with a coating composition comprising a polyurethane with a structural formula having the following recurring units:

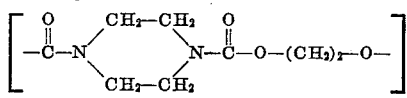

11. The process of claim 10 wherein the substrate is uniformly coated to the extent of at least about 0.1% by weight of the total structure.

12. The process of claim 11 wherein the substrate is a textile fabric.

13. The process comprising contacting the surface of a poly(ethylene terephthalate) substrate with a water-based emulsion containing an organic solution of a polyurethane with a structural formula having the following recurring units:

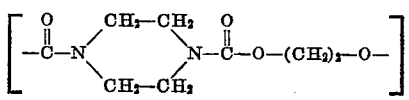

and drying the article at a temperature of at least about 100° C.

References Cited in the file of this patent

UNITED STATES PATENTS

| | | |
|---|---|---|
| 2,723,935 | Rodman | Nov. 15, 1955 |
| 2,731,446 | Wittbecker | Jan. 17, 1956 |
| 2,805,963 | Gaylord | Sept. 10, 1957 |

FOREIGN PATENTS

| | | |
|---|---|---|
| 915,868 | Germany | July 29, 1954 |